US 008560814B2

(12) United States Patent  (10) Patent No.: US 8,560,814 B2
Golla et al.  (45) Date of Patent: Oct. 15, 2013

(54) THREAD FAIRNESS ON A MULTI-THREADED PROCESSOR WITH MULTI-CYCLE CRYPTOGRAPHIC OPERATIONS

(75) Inventors: Robert T. Golla, Round Rock, TX (US); Christopher H. Olson, Austin, TX (US); Gregory F. Grohoski, Bee Cave, TX (US)

(73) Assignee: Oracle International Corporation, Redwood Shores, CA (US)

( * ) Notice: Subject to any disclaimer, the term of this patent is extended or adjusted under 35 U.S.C. 154(b) by 760 days.

(21) Appl. No.: 12/773,278

(22) Filed: May 4, 2010

(65) Prior Publication Data

US 2011/0276783 A1  Nov. 10, 2011

(51) Int. Cl.
    *G06F 9/30* (2006.01)
(52) U.S. Cl.
    USPC .......................... 712/220; 712/229; 718/107
(58) Field of Classification Search
    USPC ............. 712/1, 201, 219–221, 226, 229, 245; 718/102–103, 107–108
    See application file for complete search history.

(56) References Cited

U.S. PATENT DOCUMENTS

| 6,625,631 | B2 | 9/2003 | Ruehle |
| 6,651,158 | B2* | 11/2003 | Burns et al. ................... 712/205 |
| 6,687,725 | B1 | 2/2004 | Chen et al. |
| 6,691,143 | B2 | 2/2004 | Blaker |
| 6,697,935 | B1* | 2/2004 | Borkenhagen et al. ........ 712/228 |
| 6,732,133 | B2 | 5/2004 | Ruehle |
| 6,763,365 | B2 | 7/2004 | Chen et al. |
| 7,046,800 | B1 | 5/2006 | Tenca et al. |
| 7,181,484 | B2 | 2/2007 | Stribaek et al. |
| 7,395,356 | B2* | 7/2008 | Ma et al. ........................ 709/250 |
| 7,434,029 | B2* | 10/2008 | Chauvel et al. ................ 712/205 |
| 7,533,248 | B1* | 5/2009 | Golla et al. .................... 712/214 |
| 7,620,821 | B1 | 11/2009 | Grohoski et al. |
| 7,925,869 | B2* | 4/2011 | Kelsey et al. .................. 712/220 |
| 8,245,014 | B2* | 8/2012 | Steiss et al. .................... 712/205 |
| 2002/0174157 | A1 | 11/2002 | Bhushan et al. |
| 2005/0256920 | A1* | 11/2005 | Crispin et al. ................. 708/491 |
| 2010/0333098 | A1* | 12/2010 | Jordan et al. .................. 718/103 |

* cited by examiner

*Primary Examiner* — Andrew Caldwell
*Assistant Examiner* — Yuqing Xiao
(74) *Attorney, Agent, or Firm* — Rory D. Rankin; Meyertons, Hood, Kivlin, Kowert & Goetzel, P.C.

(57) ABSTRACT

Systems and methods for efficient execution of operations in a multi-threaded processor. Each thread may include a blocking instruction. A blocking instruction blocks other threads from utilizing hardware resources for an appreciable amount of time. One example of a blocking type instruction is a Montgomery multiplication cryptographic instruction. Each thread can operate in a thread-based mode that allows the insertion of stall cycles during the execution of blocking instructions, during which other threads may utilize the previously blocked hardware resources. At times when multiple threads are scheduled to execute blocking instructions, the thread-based mode may be changed to increase throughput for these multiple threads. For example, the mode may be changed to disallow the insertion of stall cycles. Therefore, the time for sequential operation of the blocking instructions corresponding to the multiple threads may be reduced.

20 Claims, 9 Drawing Sheets

THREAD FAIRNESS ON A MULTI-THREADED PROCESSOR WITH MULTI-CYCLE CRYPTOGRAPHIC OPERATIONS

BACKGROUND OF THE INVENTION

1. Field of the Invention

This invention relates to computing systems, and more particularly, to improving thread fairness on a multi-threaded processor with multi-cycle cryptographic operations.

2. Description of the Relevant Art

The performance of computer systems is dependent on both hardware and software. In order to increase the throughput of computing systems, the parallelization of tasks is utilized as much as possible. To this end, compilers may extract parallelized tasks from program code and many modern processor core designs have deep pipelines configured to perform multi-threading.

Often times, threads share hardware resources in a processor core. Examples of such resources include queues utilized in fetch, rename, and issue pipe stages; queues used in a load and store memory pipe stage; execution units in execution pipe stages, branch prediction schemes, and so forth. These resources may generally be shared between all active threads. Resource contention may occur when a number of instructions from active threads that request use of a given resource is greater than a number of instructions that the given resource is able to concurrently support. In some cases, resource allocation may be relatively inefficient. For example, one thread may not fully utilize its resources or may be inactive. Meanwhile, a second thread may fill its queue and/or may continue to wait for availability from an execution unit. The performance of this second thread may decrease as younger instructions are forced to wait.

For a multi-threaded processor, dynamic resource allocation between threads may result in improved overall throughput performance on commercial workloads. Still, the amount of parallelism present in a microarchitecture places pressure on shared resources within a processor core. For example, as many as 8 threads may each simultaneously request an integer arithmetic functional unit. Such a situation may lead to hazards that necessitate arbitration schemes for sharing resources, such as a round-robin or least-recently-used scheme.

Over time, shared resources can become biased to a particular thread—especially with respect to long latency operations. Examples of long latency operations include load instructions that miss the L1 data cache, floating-point multiplication and division instructions, multi-precision and Montgomery multiplication cryptographic instructions, and otherwise. A thread hog results when a thread accumulates a disproportionate share of a shared resource and the thread is slow to deallocate the resource. For certain workloads, thread hogs can cause dramatic throughput losses for not only the thread hog, but also for other threads sharing the same resource. The situation may worsen when the thread includes a "blocking instruction" that concurrently blocks other threads from using several resources during a long latency. For example, a cryptographic Montgomery multiplication instruction may block other threads from using a register file and other execution units since this instruction utilizes these resources during its operation. In addition, such an instruction has a long latency—perhaps hundreds or thousands of clock cycles. An extreme blocking of resources from other threads leads to thread fairness issues and overall reduced throughput on a multi-threaded processor.

In view of the above, efficient methods and mechanisms for improving thread fairness on a multi-threaded processor with multi-cycle cryptographic operations are desired.

SUMMARY OF THE INVENTION

Systems and methods for efficient execution of operations on a multi-threaded processor are contemplated.

In one embodiment, a processor supports the concurrent processing of instructions corresponding to multiple threads. Each thread may operate on a blocking instruction. A blocking instruction may block other threads from utilizing hardware resources for an appreciable amount of time. In one embodiment, such a blocking instruction may be a Montgomery multiplication cryptographic instruction. If each thread is configured to operate in a thread-based mode that allows the insertion of predetermined stall cycles during the execution of blocking instructions, then other threads may continue execution almost simultaneously. The other threads may execute one or more instructions during these stall cycles while utilizing the now freed hardware resources. Control circuitry may determine when to set a corresponding thread-based mode that allows the insertion of these stall cycles during execution of the blocking instructions. At times when each active thread of multiple threads is scheduled to execute a blocking instruction, the thread-based mode may be changed to increase throughput for these active threads. For example, the thread-based mode may be changed to disallow the predetermined insertion of the stall cycles for this corner case.

These and other embodiments will become apparent upon reference to the following description and accompanying drawings.

Figure 1:
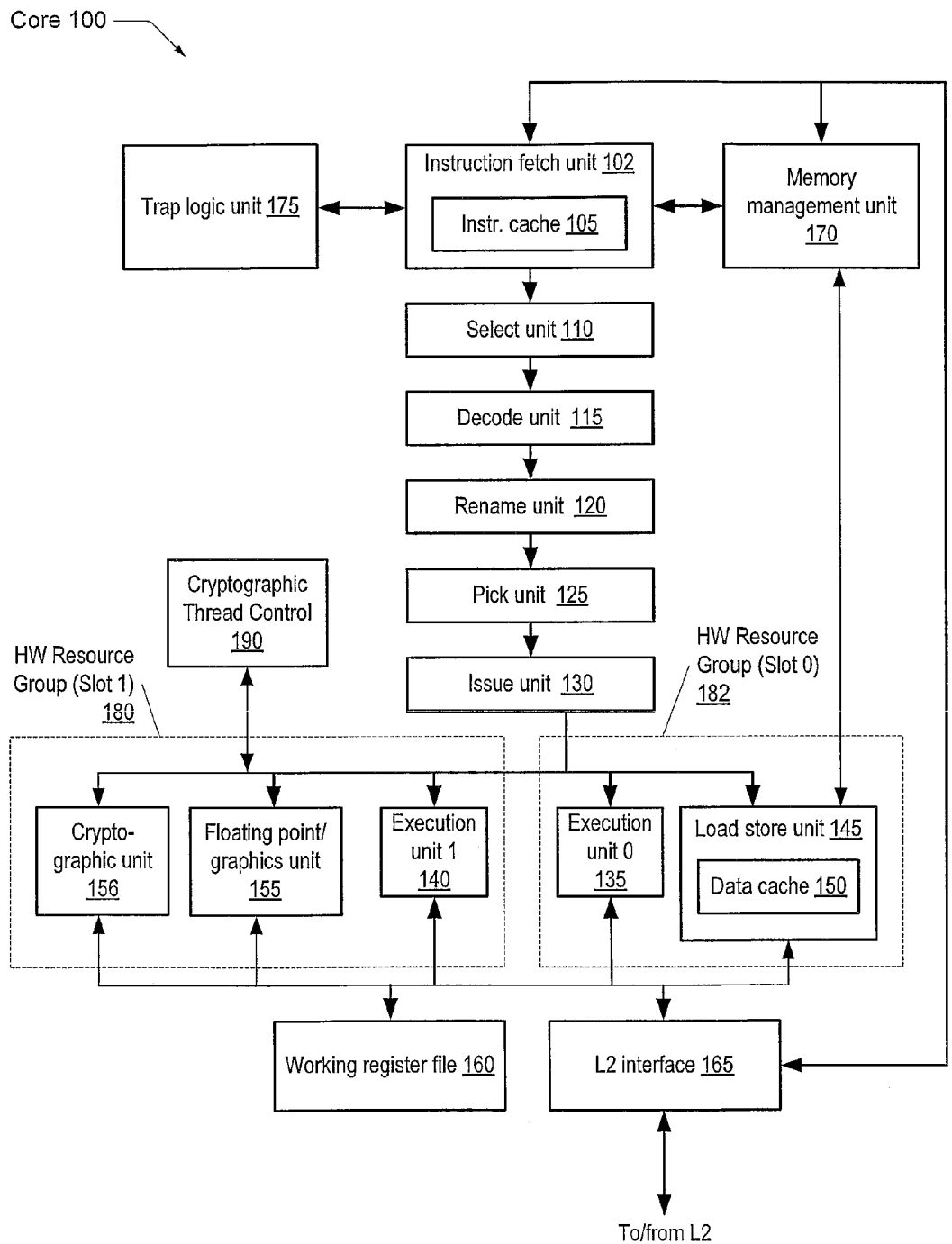
FIG. 1 is a generalized block diagram illustrating one embodiment of a processor core.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, one embodiment of a processor core 100 configured to perform dynamic multithreading is shown. Before exemplary embodiments of each of the structures of the illustrated embodiment of core 100 are described, an overview of the operation of core 100 is first provided. Processor core, or core, 100 may utilize conventional processor design techniques such as complex branch prediction schemes, out-of-order execution, and register renaming techniques. Core 100 may include circuitry for executing instructions according to a predefined instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, processor core 100 may access a cache memory subsystem for data and instructions. Core 100 may contain its own level 1 (L1) and level 2 (L2) caches in order to reduce memory latency. Alternatively, these cache memories may be coupled to processor cores 100 in a backside cache configuration or an inline configuration, as desired.

In one embodiment, processor core 100 may support execution of multiple threads. Multiple instantiations of a same processor core 100 that is able to concurrently execute multiple threads may provide high throughput execution of server applications while maintaining power and area savings. A given thread may include a set of instructions that may execute independently of instructions from another thread. For example, an individual software process may consist of one or more threads that may be scheduled for execution by an operating system. Such a core 100 may also be referred to as a multithreaded (MT) core. In one embodiment, core 100 may be configured to concurrently execute instructions from a variable number of threads, such as up to eight concurrently executing threads.

In one embodiment, core 100 may be configured for multithreaded, out-of-order execution. More specifically, in one embodiment, core 100 may be configured to perform dynamic multithreading. Generally speaking, under dynamic multithreading, the execution resources of core 100 may be configured to efficiently process varying types of computational workloads that exhibit different performance characteristics and resource requirements.

In one embodiment, core 100 may be configured to implement fine-grained multithreading. Utilizing fine-grained multithreading, core 100 may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, core 100 may be configured to efficiently process workloads that depend more on concurrent thread processing than individual thread performance. In other embodiments, core 100 may be configured to implement simultaneous multi-threading, wherein instructions from more than one thread can be executing in any given pipeline stage at a time.

In one embodiment, core 100 may also be configured to implement out-of-order processing, speculative execution, register renaming and/or other features that improve the performance of processor-dependent workloads. Moreover, core 100 may be configured to dynamically allocate a variety of hardware resources among the threads that are actively executing at a given time, such that if fewer threads are executing, each individual thread may be able to take advantage of a greater share of the available hardware resources.

In addition, instructions corresponding to the multiple threads supported by the processor may be assigned by instruction type to a slot. A slot may also be referred to as a hardware resource group. One example is a slot that includes hardware resources, such as functional units, for instruction types such as integer arithmetic or logical types, floating-point arithmetic types, branch types, and cryptographic types. Another slot may include hardware resources for instruction types such as load and store memory access types and integer arithmetic or logical types. Other embodiments for a slot may include more or less instruction types or a different combination of instruction types. The use of slots, or hardware resource groups, may ease the complexity of instruction scheduling logic.

Core 100 may also be configured to execute one or more "blocking instructions" corresponding to an instruction type that blocks multiple functional units from being available to other instruction types. For example, core 100 may be able to execute cryptographic operations such as at least one of the following: a multi-precision multiplication instruction, a Montgomery multiplication instruction, and a Montgomery square instruction. These blocking types of instructions comprise load, multiply, add, and store operations that occupy at least one or more of the following hardware resources: both integer and floating-point register files, a cryptographic functional unit, both a floating-point and an integer adder, and a store queue. When a Montgomery multiplication cryptographic type is scheduled for execution and is granted access to hardware resources in an execution pipe stage, this instruction type may block any instruction of any thread from utilizing the hardware resources of this particular slot for hundreds or even thousands of clock cycles.

The blocking described above resulting from executing a particular instruction type, such as a Montgomery multiplication cryptographic type, can lead to overall throughput losses as well as fairness issues to other threads on a multi-threaded 5 processor. Core 100 may implement fine-grained blocking within blocking instructions such as the multi-precision and Montgomery multiplication cryptographic operations and the Montgomery square operation. In one embodiment, these multiple cryptographic instruction types may be used to determine encryption keys for cryptographic algorithms such as RSA (Rivest, Shamir and Adleman) and ECC (Elliptical Curve Cryptography).

During execution of a blocking type instruction, a condition wherein one or more threads are blocked from resources by the blocking type instruction. When this condition is detected, in one embodiment, core 100 may be configured to insert one or more predetermined stall cycles. For example, after a predetermined number of clock cycles, a predetermined stall may occur for one or more clock cycles. In one embodiment, the number of stall cycles is a fixed predetermined number. Designers may derive this number based on the microarchitecture of core 100. In another embodiment, this number of stall cycles may be fixed but instruction-dependent. In yet another embodiment, this number of stall cycles may be programmable. In other embodiments, a combination of fixed, instruction-dependent, programmable, or other manners may be used to determine a number of stall cycles to use. Alternatively, this number of stall cycles may occur after a predetermined event such as a completion of a smaller multiplication operation. For example, a 256-bit or larger Montgomery multiplication cryptographic operation may perform a series of smaller 64-bit multiplication operations. After one or more of these smaller multiplication operations, the one or more results may be temporarily stored, and the number of stall cycles may occur. During the stall cycles other non-blocking instructions from other active threads may utilize the hardware resources that were previously blocked.

A number of available cryptographic functional units may be less than a number of active threads comprising Montgomery multiplication cryptographic operations or a Montgomery square operation. In one example, core 100 may comprise a single cryptographic functional unit. If there are multiple active threads with a blocking type instruction waiting for a functional unit to execute, then one or more of these threads will wait for an active thread currently executing to complete. In one embodiment, a given active thread is determined to be associated with a blocking instruction type if the given thread has a blocking type instruction waiting to be scheduled for execution. In another embodiment, a given active thread is determined to be associated with a blocking instruction type if the given thread has recently committed a blocking type instruction. In one embodiment, when all active threads in core 100 are associated with a blocking type instruction, then the active threads may not execute with predetermined stall cycles.

In one embodiment, a given slot (or a given hardware resource group) of one or more slots in core 100 may comprise a first execution unit corresponding to a blocking type instruction and one or more other execution units corresponding to non-blocking type instructions. When the given slot is executing a blocking type instruction, one or more waiting non-blocking type instructions are blocked from utilizing the one or more other execution units unless predetermined stall cycles are inserted in the execution of the blocking type instruction. During the predetermined stall cycles, the waiting non-blocking type instructions may utilize the one or more other execution units within the given slot.

In one embodiment, core 100 includes circuitry configured to manage a plurality of threads. During operation, the circuitry may identify a condition wherein all or no active threads of the plurality of threads supported by the processor are associated with a blocking type instruction. One example of being associated with a blocking type instruction as described earlier includes a given active thread has recently committed a blocking type instruction. If the condition is detected, then any blocking type instructions are executed without insertion of predetermined stall cycles.

Illustrated examples of the execution of blocking type instructions, the insertion of the predetermined stalls are provided later. In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

In the illustrated embodiment, core 100 includes an instruction fetch unit (IFU) 102 that includes an L1 instruction cache 105. IFU 102 is coupled to a memory management unit (MMU) 170, L2 interface 165, and trap logic unit (TLU) 175. IFU 102 is additionally coupled to an instruction processing pipeline that begins with a select unit 110 and proceeds in turn through a decode unit 115, a rename unit 120, a pick unit 125, and an issue unit 130. Issue unit 130 is coupled to issue instructions to any of a number of instruction execution resources: an execution unit 0 (EXU0) 135, an execution unit 1 (EXU1) 140, a load store unit (LSU) 145 that includes a L1 data cache 150, and/or a floating point/graphics unit (FGU) 155. These instruction execution resources are coupled to a working register file 160. Additionally, LSU 145 is coupled to L2 interface 165 and MMU 170.

Instruction fetch unit (IFU) 102 may be configured to provide instructions to the rest of core 100 for execution. In one embodiment, IFU 102 may be configured to select a thread to be fetched, fetch instructions from instruction cache 105 for the selected thread and buffer them for downstream processing, request data from an L2 cache via the L2 cache interface 165 in response to instruction cache misses, and predict the direction and target of control transfer instructions (e.g., branches). In some embodiments, IFU 102 may include a number of data structures in addition to instruction cache 105, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified. Such translation mappings may be stored in an ITLB (instruction translation lookaside buffer) or a DTLB (data translation lookaside buffer) for rapid translation of virtual addresses during lookup of instruction cache 105 or data cache 150. In the event no translation for a given virtual page number is found in the appropriate TLB (translation lookaside buffer), memory management unit 170 may be configured to provide a translation. In one embodiment, MMU 170 may be configured to manage one or more translation tables stored in system memory and to traverse such tables (which in some embodiments may be hierarchically organized) in response to a request for an address translation, such as from an ITLB or DTLB miss.

During the course of operation of some embodiments of core 100, exceptional events may occur. For example, an instruction from a given thread that is selected for execution by select unit 110 may not be a valid instruction for the ISA implemented by core 100 (e.g., the instruction may have an illegal opcode), a floating-point instruction may produce a result that needs further processing in software, MMU 170 may not be able to complete a page table walk due to a page miss, or any of numerous other possible architecturally-defined or implementation-specific exceptional events may occur. In one embodiment, trap logic unit 175 may be configured to manage the handling of such events. For example, TLU 175 may be configured to receive notification of an exceptional event occurring during execution of a particular thread, and to cause execution control of that thread to vector to a supervisor-mode software handler (i.e., a trap handler) corresponding to the detected event. In one embodiment, TLU 175 may be configured to flush all instructions from the trapping thread from any stage of processing within core 100, without disrupting the execution of other, non-trapping threads.

In the illustrated embodiment, L2 interface 165 may be configured to provide a centralized interface to the L2 cache associated with a particular core 100, on behalf of the various functional units that may generate L2 accesses. In one embodiment, during each execution cycle of core 100, IFU 102 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 102, instructions may actually be fetched for the selected thread. To perform the fetch, in one embodiment, IFU 102 may be configured to generate a fetch address to be supplied to instruction cache 105. The generated fetch address may then be applied to instruction cache 105 to determine whether there is a cache hit. In some embodiments, IFU 102 may also be configured to prefetch instructions into instruction cache 105 before the instructions are actually requested to be fetched.

As mentioned above, IFU 102 may be configured to predict the direction and target of control transfer instructions (CTIs) in order to reduce the delays incurred by waiting until the effect of a CTI is known with certainty. Generally speaking, select unit 110 may be configured to select and schedule threads for execution. In one embodiment, during any given execution cycle of core 100, select unit 110 may be configured to select up to one ready thread out of the maximum number of threads concurrently supported by core 100 (e.g., 8 threads), and may select up to two instructions from the selected thread for decoding by decode unit 115, although in other embodiments, a differing number of threads and instructions may be selected. In various embodiments, different conditions may affect whether a thread is ready for selection by select unit 110, such as branch mispredictions, unavailable instructions, or other conditions. To ensure fairness in thread selection, some embodiments of select unit 110 may employ arbitration among ready threads (e.g. a least-recently-used algorithm).

The particular instructions that are selected for decode by select unit 110 may be subject to the decode restrictions of decode unit 115; thus, in any given cycle, fewer than the maximum possible number of instructions may be selected. Additionally, in some embodiments, select unit 110 may be configured to allocate certain execution resources of core 100 to the selected instructions, so that the allocated resources will not be used for the benefit of another instruction until they are released. For example, select unit 110 may allocate resource tags for entries of a reorder buffer, load/store buffers, or other downstream resources that may be utilized during instruction execution.

Generally, decode unit 115 may be configured to prepare the instructions selected by select unit 110 for further processing. Decode unit 115 may be configured to identify the particular nature of an instruction (e.g., as specified by its opcode) and to determine the source and sink (i.e., destination) registers encoded in an instruction, if any. In some embodiments, decode unit 115 may be configured to detect certain dependencies among instructions, to remap architectural registers to a flat register space, and/or to convert certain complex instructions to two or more simpler instructions for execution.

In some embodiments, decode unit 115 may be configured to assign instructions according to instruction types to hardware resource groups, or slots, for subsequent scheduling. In one embodiment, two slots 0-1 may be defined, where slot 0 includes instructions executable in load/store unit 145 or execution unit 135, and where slot 1 includes instructions executable in execution unit 140, floating point/graphics unit 155, and any branch instructions. Hardware resource group 180 corresponds to slot 1 and hardware resource group 182 corresponds to slot 0. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 120 may be configured to rename the logical (i.e., architected) destination registers specified by instructions by mapping them to a physical register space, resolving false dependencies in the process. In some embodiments, rename unit 120 may maintain mapping tables that reflect the relationship between logical registers and the physical registers to which they are mapped.

Once decoded and renamed, instructions may be ready to be scheduled for execution. In the illustrated embodiment, pick unit 125 may be configured to pick instructions that are ready for execution and send the picked instructions to issue unit 130. In one embodiment, pick unit 125 may be configured to maintain a pick queue that stores a number of decoded and renamed instructions as well as information about the relative age and status of the stored instructions. A valid field for a queue entry in the pick unit 125 may be updated with a value to indicate a valid entry when the entry is allocated. A pick queue entry within pick unit 125 may be deallocated upon instruction completion if, for example, no load/store hazards exist for the corresponding pick queue entry. The corresponding valid field may be reset to a value indicating an empty entry when the entry is deallocated. A picked field stored within a pick queue in the pick unit 125 may be used to indicate a corresponding instruction has been picked. Also, this picked field may be used to ensure the corresponding instruction is not subsequently re-picked. Between a first clock cycle when a particular instruction is picked and a second clock cycle when the particular entry is deallocated, the particular instruction may not be re-picked due to a set value in the picked field.

During each execution cycle, this embodiment of pick unit 125 may pick up to one instruction per slot. For example, taking instruction dependency and age information into account, for a given slot, pick unit 125 may be configured to pick the oldest instruction for the given slot that is ready to execute. For example, in a given thread and a given clock cycle, pick unit 125 may pick an oldest instruction for hardware resource group 180 and another oldest instruction for hardware resource group 182. However, pick unit 125 may pick an oldest instruction for each of the hardware resource groups 180-182 when these hardware resource groups are available. If floating-point unit 155 is still performing a multi-cycle floating-point divide operation, then no instruction may be picked for hardware resource group 180. Similarly, if cryptographic unit 156 is still executing a multi-cycle Montgomery multiplication cryptographic instruction, then no instruction may be picked for hardware resource group 180 unless a predetermined stall cycle is occurring.

In some embodiments, pick unit 125 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 125 may be configured to deliberately insert "holes" into the pipeline through the use of stalls, e.g., in order to manage downstream pipeline hazards such as synchronization of certain load/store or long-latency FGU instructions.

Issue unit 130 may be configured to provide instruction sources and data to the various execution units for picked instructions. In one embodiment, issue unit 130 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 160 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units for execution. In one embodiment, each of EXU0 135 and EXU1 140 may be similarly or identically configured to execute certain integer-type instructions defined in the implemented ISA, such as arithmetic, logical, and shift instructions. In the illustrated embodiment, EXU0 135 may be configured to execute integer instructions issued from slot 0, and may also perform address calculation and for load/store instructions executed by LSU 145. EXU1 140 may be configured to execute integer instructions issued from slot 1, as well as branch instructions. In one embodiment, FGU instructions and multi-cycle integer instructions may be processed as slot 1 instructions that pass through the EXU1 140 pipeline, although some of these instructions may actually execute in other functional units.

In some embodiments, architectural and non-architectural register files may be physically implemented within or near execution units 135-140. It is contemplated that in some embodiments, core 100 may include more or fewer than two integer execution units, and the execution units may or may not be symmetric in functionality. Also, in some embodiments execution units 135-140 may not be bound to specific issue slots, or may be differently bound than just described.

Floating point/graphics unit 155 may be configured to execute and provide results for certain floating-point and graphics-oriented instructions defined in the implemented ISA. For example, in one embodiment FGU 155 may implement single- and double-precision floating-point arithmetic instructions compliant with the IEEE 754-1985 floating-point standard.

Load store unit 145 may be configured to process data memory references, such as integer and floating-point load and store instructions and other types of memory reference instructions. LSU 145 may include a data cache 150 as well as logic configured to detect data cache misses and to responsively request data from an L2 cache via the L2 cache interface 165. In one embodiment, data cache 150 may be configured as a set-associative, writethrough cache in which all stores are written to the L2 cache regardless of whether they hit in data cache 150. As noted above, the actual computation of addresses for load/store instructions may take place within one of the integer execution units, though in other embodiments, LSU 145 may implement dedicated address generation logic. In some embodiments, LSU 145 may implement an adaptive, history-dependent hardware prefetcher configured to predict and prefetch data that is likely to be used in the future, in order to increase the likelihood that such data will be resident in data cache 150 when it is needed.

In various embodiments, LSU 145 may implement a variety of structures configured to facilitate memory operations. For example, LSU 145 may implement a data TLB to cache virtual data address translations, as well as load and store buffers configured to store issued but not-yet-committed load and store instructions for the purposes of coherency snooping and dependency checking LSU 145 may include a miss buffer configured to store outstanding loads and stores that cannot yet complete, for example due to cache misses. In one embodiment, LSU 145 may implement a store queue configured to store address and data information for stores that have committed, in order to facilitate load dependency checking LSU 145 may also include hardware configured to support atomic load-store instructions, memory-related exception detection, and read and write access to special-purpose registers (e.g., control registers).

A cryptographic thread control logic block 190 may include circuitry to determine a thread-based mode of operation for blocking instructions. One mode may include fine-grained blocking in the execution of blocking instructions. For example, one or more stall cycles may be inserted in the execution cycles as discussed earlier. The logic in block 190 may receive inputs from other units in core 100 and output a thread-based operating mode to the cryptographic unit 156. In one embodiment, the logic in block 190 may be centrally located in block 190. In another embodiment, the logic in block 190 may not be centrally located in block 190, but dispersed on a thread basis and located among other units. A more detailed description of the logic used in cryptographic thread control 190 is provided later.

Figure 2:
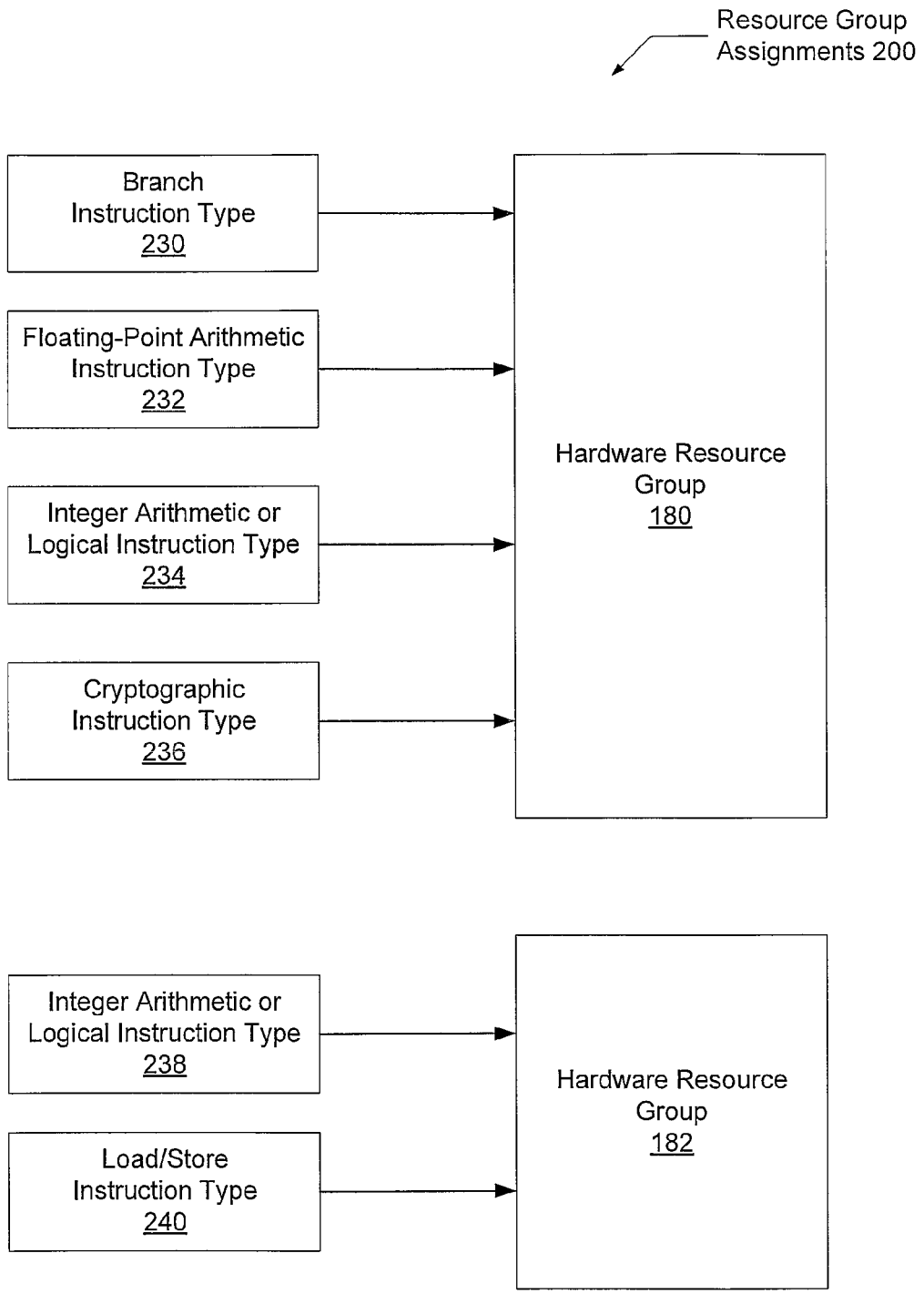
FIG. 2 is a generalized block diagram illustrating resource group assignments.

Turning now to FIG. 2, one embodiment of resource group assignments 200 is shown. Hardware components that correspond to those of FIG. 1 are numbered identically. Again, hardware resource group 180 may correspond to slot 1 as described above. Similarly, hardware resource group 182 may correspond to slot 0. As shown, in one embodiment, the instruction types that may be assigned to hardware resource group 180 include: branch type 230, floating-point (FP) arithmetic type 232, integer arithmetic or logical type 234, and cryptographic type 236. As shown, in one embodiment, the instruction types that may be assigned to hardware resource group 182 include: integer arithmetic or logical type 238 and load and store memory reference type 240. As discussed earlier, EXU1 140 may execute the branch instruction type 230 within hardware resource group 180, which is also used to execute integer arithmetic or logical type 234. EXU0 135 may determine address calculations within hardware resource group 182, which is also used to execute integer arithmetic or logical type 238.

Figure 3:
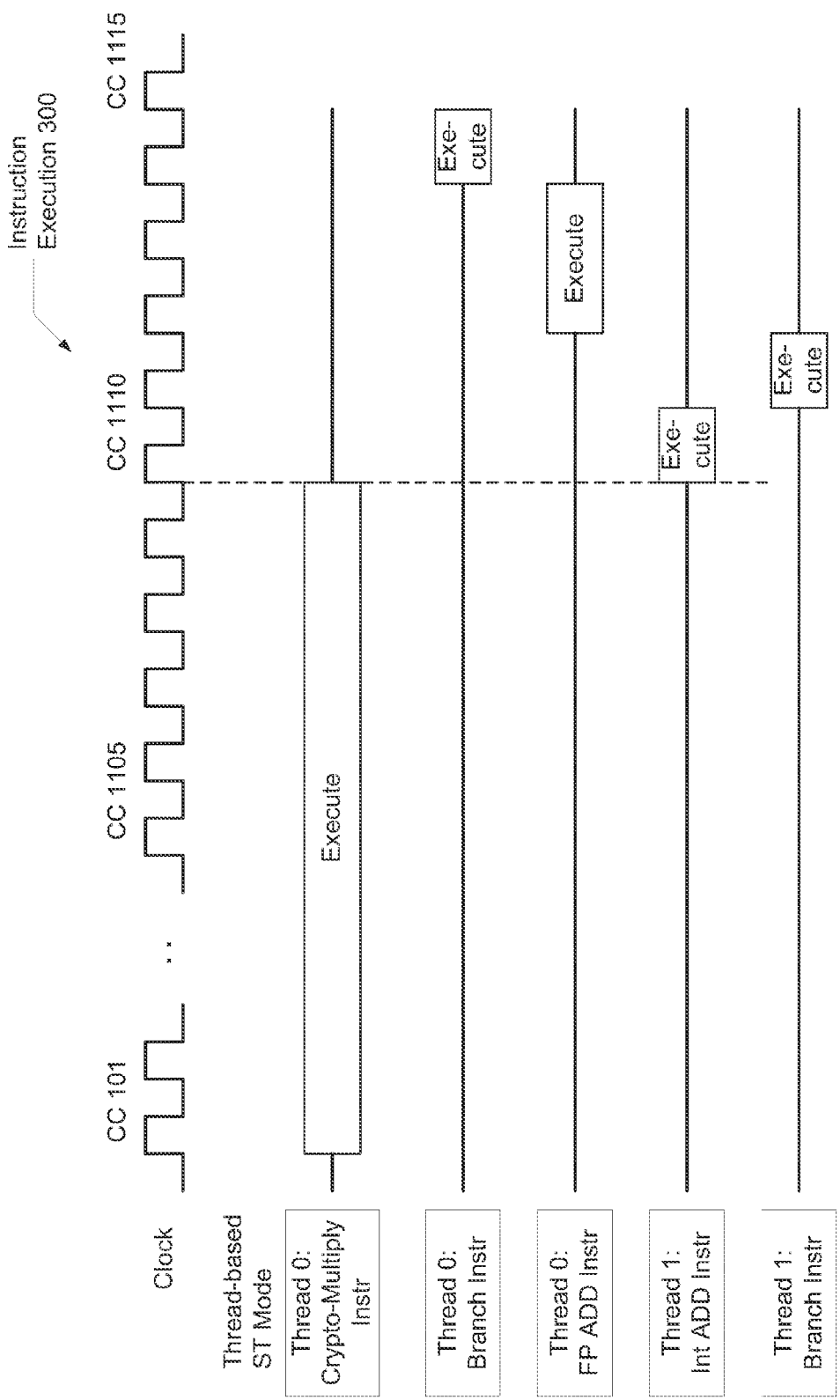
FIG. 3 is a generalized block diagram of one embodiment of instruction execution with core multi-threading.

Referring now to FIG. 3, one embodiment of instruction execution 300 with core multi-threading is shown. The blocking nature of some instruction types is illustrated. As shown, two threads (thread 0 and thread 1) comprise instructions ready to be picked for execution. Only two threads are shown for illustrative purposes. More active threads are possible and contemplated. In the embodiment shown, the instruction types ready to be picked correspond to a same hardware resource group, such as hardware resource group 180. In this example, only one hardware resource group is available for cryptographic instructions. Thread 0 comprises a Montgomery multiplication cryptographic instruction. This instruction is picked for execution and begins execution in clock cycle (CC) 101. It is noted that this instruction corresponds to a thread-based single-threaded (ST) mode. This mode may determine whether or not to execute the Montgomery multiplication cryptographic instruction with fine-grained blocking Fine-grained blocking may include the use of predetermined stall cycles as discussed earlier. The switching of the thread-based operating modes between single-threaded (ST) and multi-threaded (MT) is discussed later. It is noted that the thread-based modes are separate from a core-based ST mode and a core-based MT mode. In this example, the core 100 is operating in a MT mode, but the individual thread, thread 0, is operating in a ST mode, which shuts off fine-grained blocking.

During the execution of the Montgomery multiplication cryptographic instruction, other instructions are blocked from utilizing functional units in hardware resource group 180. This instruction completes execution in CC 1109 and in the subsequent clock cycle, CC 1110, the other instructions may begin execution. In the embodiment shown, the integer ADD instruction in the other thread (thread 1) is given priority over the branch instruction in thread 0. Such a priority scheme may be used to provide fairness among the threads. In another embodiment, the other instructions may not be able to begin execution immediately after the cryptographic instruction completes. One or more clock cycles may be needed for a determination to be made in logic inside the pick unit 125 and for instruction pipeline traversal through issue unit 130.

Figure 4:
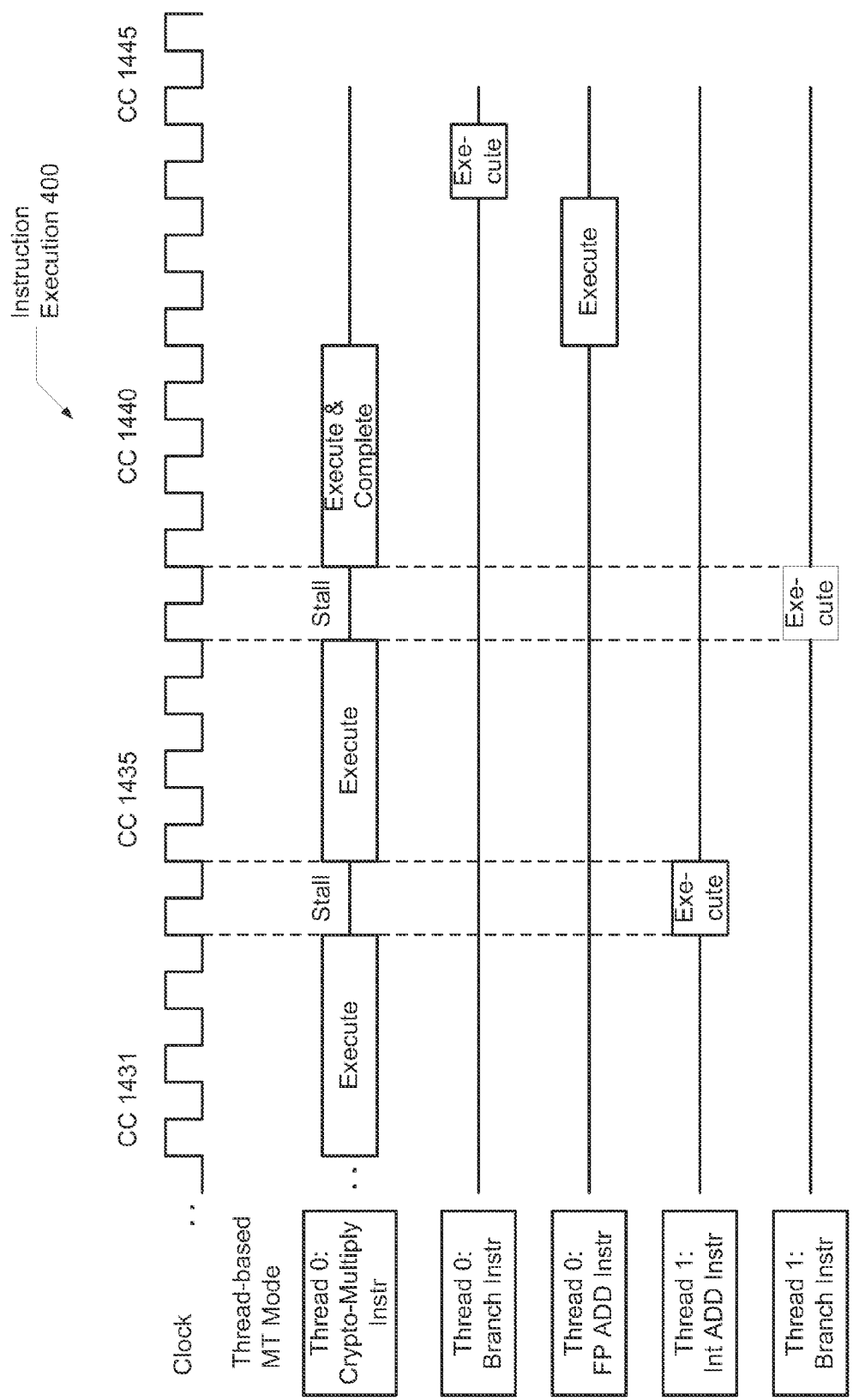
FIG. 4 is a generalized block diagram of one embodiment of instruction execution with core multi-threading and fine-grained blocking.

Referring now to FIG. 4, one embodiment of instruction execution 400 with core multi-threading and fine-grained blocking is shown. A reduction in the blocking nature of blocking type instructions by the use of stall cycles is illustrated. Two threads (thread 0 and thread 1) comprise instructions ready to be picked for execution at CC 1431. Only two threads are shown for illustrative purposes. More active threads are possible and contemplated. In the embodiment shown, the instruction types ready to be picked correspond to a same hardware resource group, such as hardware resource group 180. In this example, only one hardware resource group is available for cryptographic instructions. Core 100 may implement fine-grained blocking within the multi-precision and Montgomery multiplication cryptographic operations. At this time, thread 0 may have recently committed a blocking type instruction. After a predetermined number of clock cycles of execution, a predetermined stall may occur for one or more clock cycles during the execution of a blocking type instruction in thread 0.

In the embodiment shown, the Montgomery multiplication cryptographic instruction executes for 3 clock cycles, stalls for 1 cycle, and repeats. The choice of 3 execution clock cycles and 1 stall cycle is for illustrative purposes. Other choices are possible and contemplated. As discussed earlier, a predetermined stall cycle may occur after a fixed predetermined number of execution cycles, after a predetermined event such as completion of a smaller multiplication or addition operation, or after a programmable number of clock cycles. The stall itself may occur for a fixed predetermined number of clock cycles or a programmable number of clock cycles. In addition, both the number of execution cycles and stall cycles may be instruction type dependent. A Montgomery square cryptographic type may have different numbers for both execution and stalls than a Montgomery multiplication cryptographic type. The fine-grained blocking is not limited to cryptographic instructions. The fine-grained blocking may be used for multimedia, video graphics, or other types of instructions that block hardware resources from other threads for an appreciable amount of time. It is noted in the embodiment shown, the Montgomery multiplication cryptographic instruction is operating in a thread-based multi-threaded (MT) mode, which allows for fine-grained blocking. The switching of the thread-based operating modes between single-threaded (ST) and multi-threaded (MT) is discussed shortly.

Figure 5:
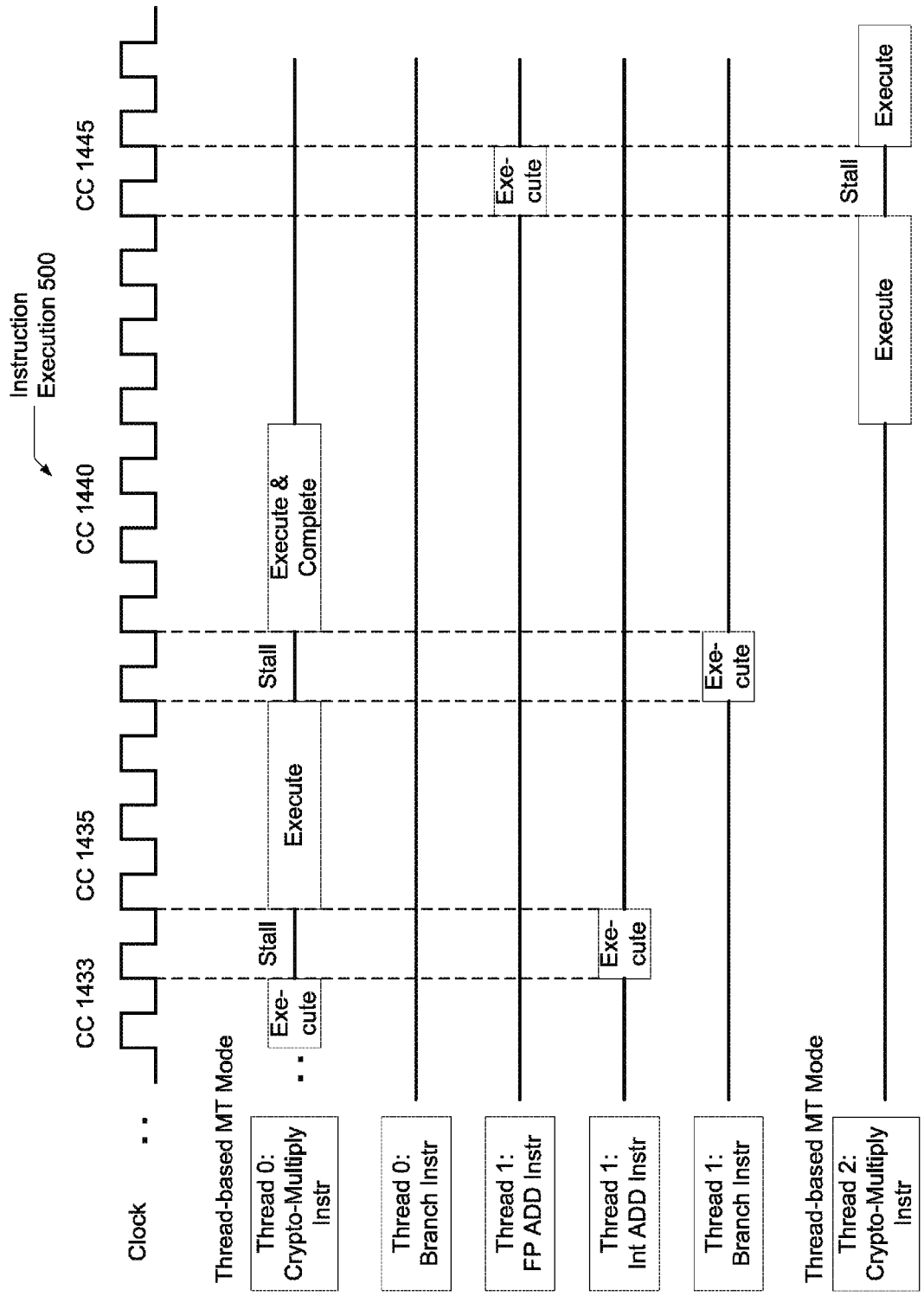
FIG. 5 is a generalized block diagram of another embodiment of instruction execution with core multi-threading and fine-grained blocking.

Turning now to FIG. 5, one embodiment of instruction execution 500 with core multi-threading and fine-grained blocking is shown. Three threads, thread 0 to thread 2, comprise instructions ready to be picked for execution at CC 1433. More active threads are possible and contemplated. In the embodiment shown, the instruction types ready to be picked correspond to a same hardware resource group, such as hardware resource group 180 in FIG. 1. In this example, only one hardware resource group is available for cryptographic instructions. In this example, both thread 0 and thread 2 may have recently committed a blocking type instruction prior to CC 1433. The Montgomery multiplication cryptographic instruction of thread 0 operates with predetermined stall cycles. The integer ADD instruction and the branch instruction of thread 1 are able to execute during these stall cycles. The Montgomery multiplication cryptographic instruction of thread 2 waits since there is only one cryptographic functional unit 156 in this example. After thread 0 completes its Montgomery multiplication cryptographic instruction, thread 2 may begin its cryptographic operation with inserted predetermined stall cycles.

Figure 6:
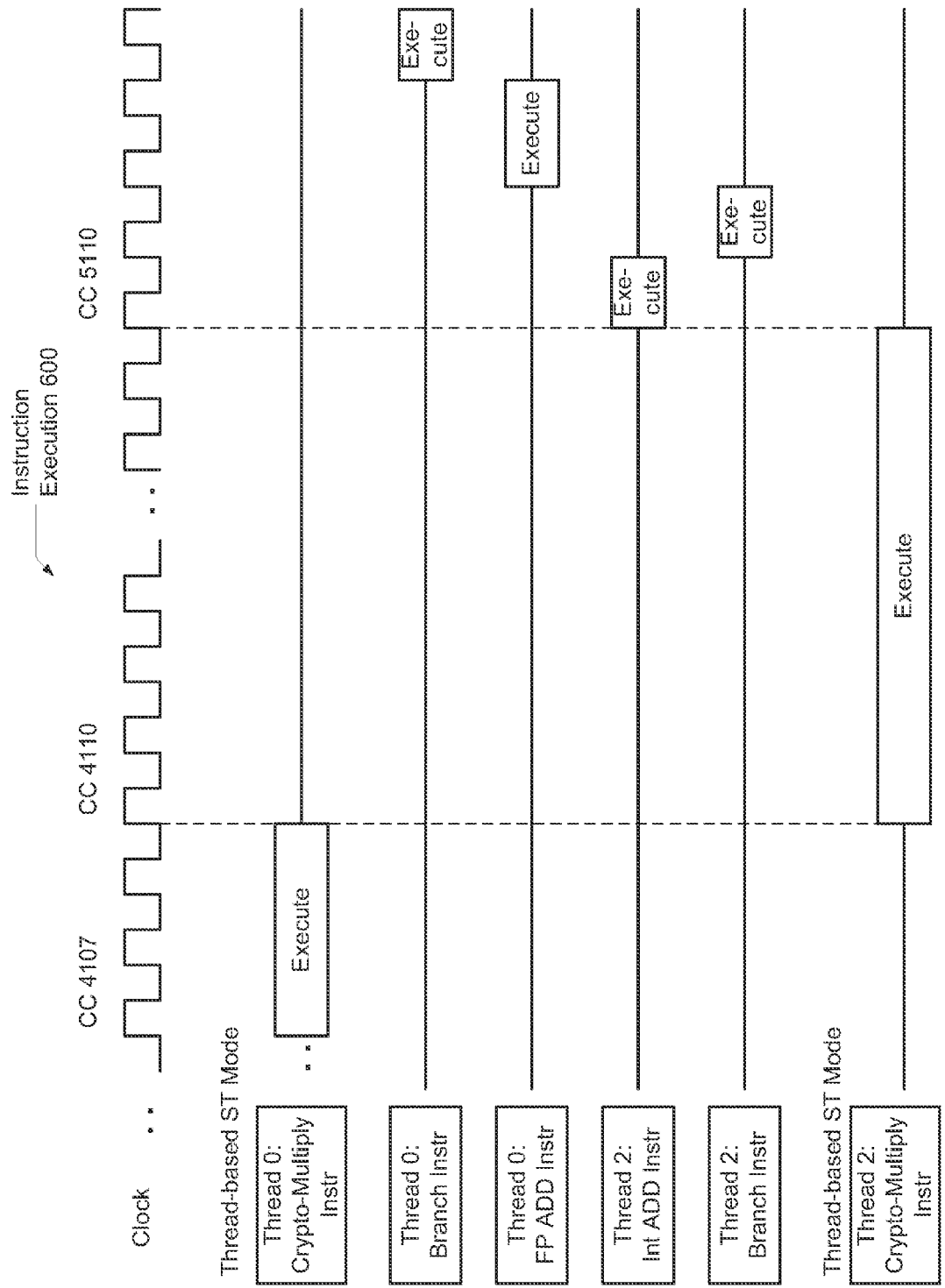
FIG. 6 is a generalized block diagram of another embodiment of instruction execution with core multi-threading.

Turning now to FIG. 6, one embodiment of instruction execution 600 with core multi-threading is shown. Continuing with the example shown in FIG. 5, thread 1 may complete, become inactive, and leave only thread 0 and thread 2 as the remaining active threads in the processor. Both thread 0 and thread 2 have already been determined to be associated with a blocking type instruction. Therefore, the condition may be detected wherein all active threads in the processor are associated with a blocking type instruction, and accordingly, no insertion of predetermined stall cycles is used. There are no active threads that do not correspond to a blocking type instruction that would be able to take advantage of any inserted predetermined stall cycles. Therefore, operations, such as building an encryption key for a cryptographic algorithm may finish as soon as possible without sacrificing thread fairness.

In the examples shown in FIG. 3 to FIG. 6, in one embodiment, a thread may be determined to be operating on a blocking instruction only after a blocking instruction has been committed. In this manner, it is known the blocking instruction is not included in a speculative path. The detection of a blocking type instruction during a decode pipe stage or a renaming pipe stage may be used to schedule which thread obtains a functional unit. However, a detection this early in the pipeline may not be used to associate a given thread with a blocking type instruction since it is unknown yet if this instruction is included in a speculative path. Further, in order to identify a given thread as no longer operating on blocking instructions, a count of instructions executed since a last blocking instruction may be maintained. When the count reaches a predetermined threshold value, then the thread may be determined to no longer operate on blocking instructions. Further details are provided in the methods described below.

Figure 7:
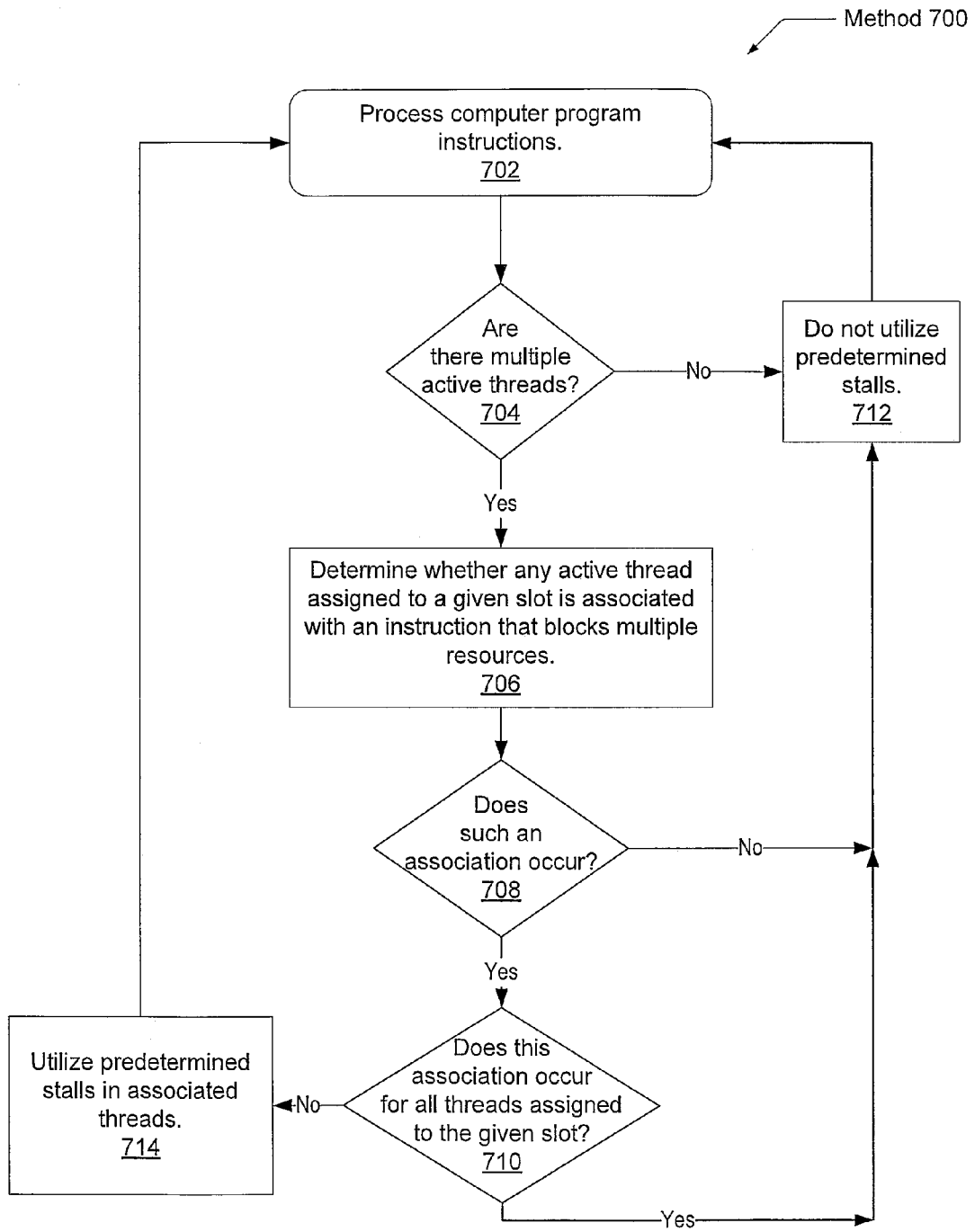
FIG. 7 is a generalized flow diagram of one embodiment of a method for improving thread fairness on a multi-threaded processor with blocking type instructions.

Referring now to FIG. 7, one embodiment of a method 700 for improving thread fairness on a multi-threaded processor with blocking type instructions is shown. The components embodied in core 100 described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

In one embodiment, method 700 may illustrate a state machine for a given hardware resource group. In block 702, a processor core 100 may be executing instructions of one or more software applications corresponding to one or more threads. Core 100 may fetch instructions concurrently for one or more threads. These fetched instructions are decoded and renamed. Renamed instructions are allocated in pick unit 125. If there are no other active threads in the pipeline (conditional block 704), then in block 712, the lone thread operates in a thread-based single-threaded (ST) mode. No fine-grained blocking is used during execution of instructions corresponding to this lone thread. Typically, for active threads with no blocking instructions, the instructions operate with no fine-grained blocking. The ST mode does not alter their execution. The ST mode and the MT mode generally only alter the execution of blocking instructions, which affects when non-blocking instructions may begin execution.

If there are any other active threads in the pipeline (conditional block 704), then in block 706, it is determined whether any of the active threads is associated with a blocking type instruction. In one embodiment, a given thread is determined to be associated with a blocking type instruction when the given thread has recently committed a blocking type instruction. Again, one example of a blocking type instruction is a Montgomery multiplication cryptographic instruction. For a given slot configured to execute a blocking type instruction, if any active thread assigned to the given slot is determined to be associated with a blocking type instruction (conditional block 708), and it is determined that all of the active threads assigned to the given slot is associated with a blocking type instruction (conditional block 710), then control flow of method 700 moves to block 712 where no predetermined stall cycles are used.

For the given slot discussed above, if any active thread assigned to the given slot is determined to be associated with a blocking type instruction (conditional block 708), and it is determined that at least one active thread assigned to the given slot is not associated with a blocking type instruction (conditional block 710), then in block 714, the MT mode is assigned to threads associated with a blocking type instruction. Fine-grained blocking is used during execution of blocking type instructions corresponding to these threads. The predetermined stall cycles will be used during execution of the blocking type instructions, which allows threads assigned to the given slot that are not associated with a blocking type instruction to execute instructions on the same hardware resources during the inserted stall cycles. Therefore, thread fairness may be maintained. In one embodiment, a thread is assigned to a given slot if the thread is already utilizing resources within the given slot to execute instructions. Alternatively, a thread is assigned to a given slot if the thread has an instruction waiting for execution and the instruction is scheduled to execute in the given slot. In one embodiment, for a given thread having a corresponding thread-based mode set to MT mode immediately affects the execution of a currently executing blocking type instruction. In another embodiment, for a given thread having a corresponding thread-based mode set to MT mode affects the execution of a subsequent blocking type instruction. If a blocking type instruction is currently executing, execution may continue without insertion of predetermined stall cycles.

Figure 8:
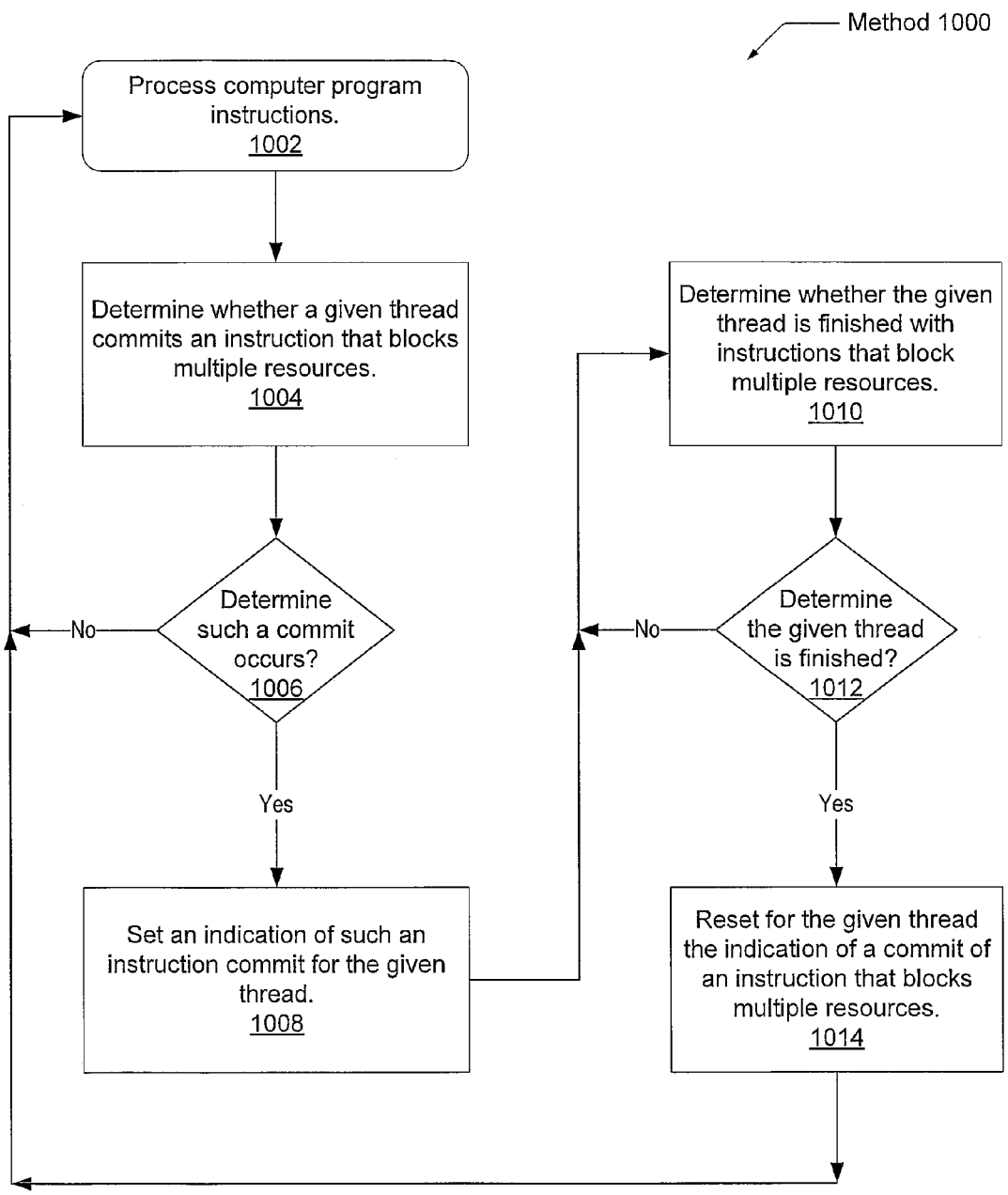
FIG. 8 is a generalized flow diagram of one embodiment of a method for detecting a thread is operating on a non-speculative blocking instruction.

Referring now to FIG. 8, one embodiment of a method 1000 for detecting a thread is operating on a non-speculative blocking instruction is shown. The components embodied in core 100 described above may generally operate in accordance with method 1000. Similar to methods 700-800, the steps in this embodiment are shown in sequential order. However, some steps may occur in a different order than shown, some steps may be performed concurrently, some steps may be combined with other steps, and some steps may be absent in another embodiment.

In block 1002, a processor core 100 may be processing instructions of one or more software applications corresponding to one or more threads. In block 1004, a determination is made whether a given thread commits a blocking instruction. If such a commit operation occurs (conditional block 1006), then in block 1008, a corresponding indication is set for the given thread. This indication may be used to determine whether any active threads assigned to a given slot is associated with a blocking type instruction. In block 1010, a determination is made whether the given thread is finished with operating on blocking instructions. Details of this step are provided shortly. If it is determined the given thread is finished with blocking instructions (conditional block 1012), then in block 1014, the corresponding indication is reset.

Figure 9:
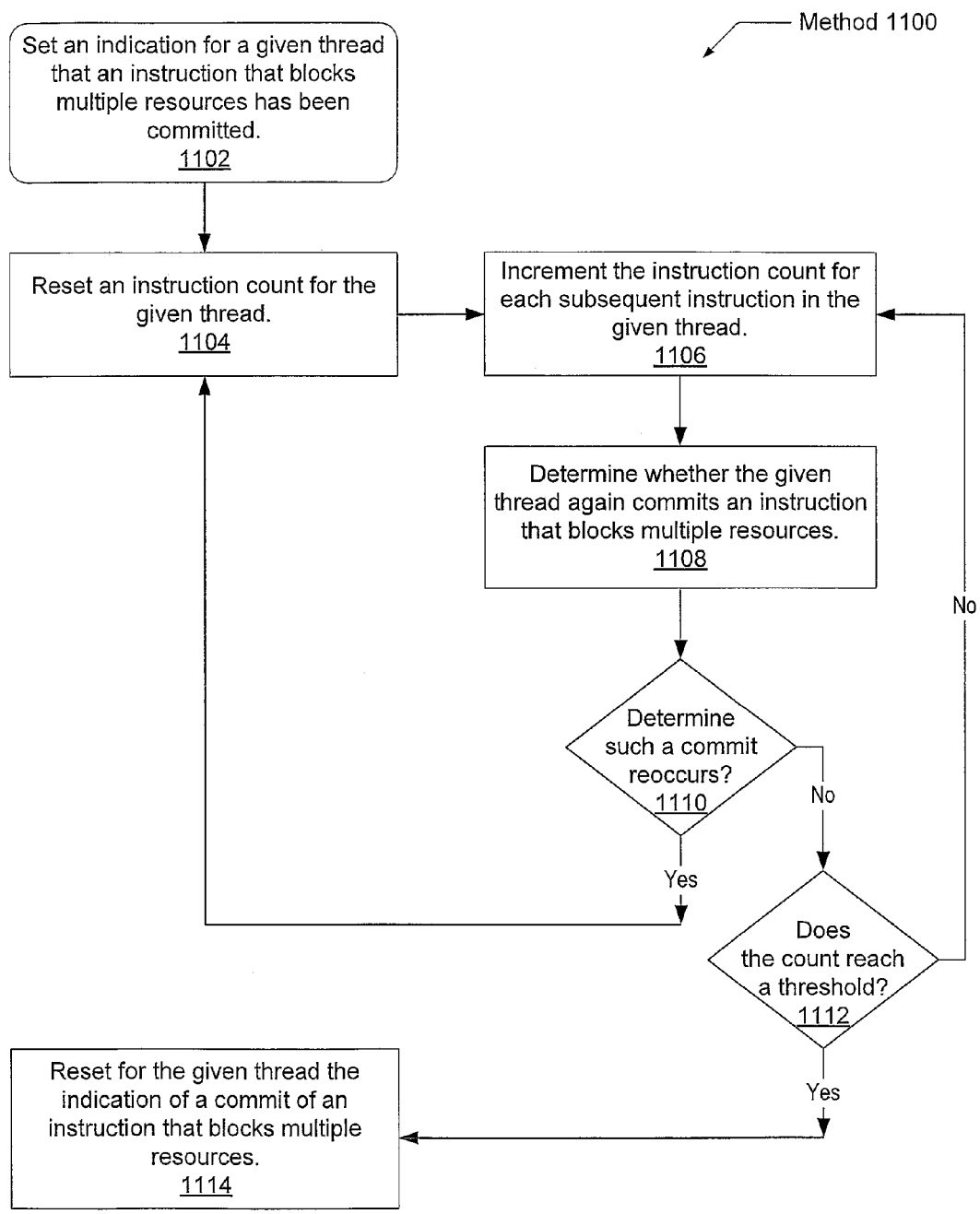
FIG. 9 is a generalized flow diagram of one embodiment of a method for detecting a thread is finished operating on blocking instructions.

Turning now to FIG. 9, one embodiment of a method 1100 for detecting a thread is finished operating on blocking instructions is shown. The components embodied in core 100 described above may generally operate in accordance with method 1100. The steps in this embodiment are shown in sequential order. However, some steps may occur in a different order than shown, some steps may be performed concurrently, some steps may be combined with other steps, and some steps may be absent in another embodiment.

In block 1102, an indication is set for a given thread that is detected to operate on blocking instructions. This step is similar to step 1008 of method 1000. A commit of a blocking instruction may cause the indication to be set. In block 1104, an instruction count is reset. In block 1106, the instruction count may be incremented for each subsequent instruction that reaches a predetermined pipe stage for the given thread. In one embodiment, the instruction count may correspond to committed instructions for a given thread. In another embodiment, the instruction count may correspond to decoded, renamed, or executed instructions. If a pipe stage other than a commit pipe stage is chosen for incrementing the instruction count, it is known this count may be including speculative instructions.

In block 1108, a determination is made whether the given thread commits a blocking instruction. This step is similar to step 1004 in method 1000. If it is found that the given thread does commit a blocking instruction (conditional block 1110), then control flow of method 1100 returns to block 1104. The instruction count is reset in block 1104. Otherwise, if the given thread has not committed a subsequent blocking instruction (conditional block 1110), and the instruction count has not reached a predetermined threshold value (conditional block 1112), then control flow of method 1100 returns to block 1106.

In various embodiments, the predetermined threshold may be selected based upon a number of overhead instructions related to a corresponding blocking instruction. For example, for a 2048 bit Montgomery multiplication instruction (32×64 bit), supporting code may include: 32 loads for first operand, 32 loads for a second operand, 32 loads for N (where N represents xxxxx), 1 loads for N' (where N' represents yyyyy), and 32 stores for the result—for a total of 129 loads and/or stores. It is noted there may be other associated instructions included the overhead as well (e.g., instructions to test flags, check for various error conditions, etc.). Assuming such an instruction, the predetermined threshold may be set to a value larger than the total of 129 instructions used to support the 32×64-bit Montgomery multiplication cryptographic instruction.

In one embodiment, a factor of approximately 2 times the total number of instructions discussed above may be used (or a count of 258 instructions) as a predetermined threshold. In another embodiment, a factor of 4 times this number may be used (or a count of 516 instructions) as a predetermined threshold. In other embodiments, different factor may be chosen. For implementations which utilize other instruction types (e.g., a 64×64 bit Montgomery multiplication instruction, non-Montgomery type instructions, or otherwise), the overhead may vary and the threshold value may be chosen to be larger or smaller, as appropriate, in order to accommodate these different instructions. If the instruction count has reached a predetermined threshold value (conditional block 1112), then in block 1114, the indication that the given thread is operating on a blocking instruction is reset.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM (compact disc-read only memory), DVD (digital versatile disc), flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A microprocessor comprising:
    an instruction pipeline configured to concurrently process instructions corresponding to a plurality of threads, wherein the instruction pipeline comprises one or more hardware (HW) resource groups each configured to execute instructions; and
    control circuitry;
    wherein for a given HW resource group of the one or more HW resource groups, the control circuitry is configured to:
        identify at least two active threads configured to utilize the given HW resource group and execute an instruction of a first type, the given HW resource group being configured to support only one of the at least two active threads at a given time;
        set a thread mode for a first thread of the at least two active threads to a first mode which causes an issued instruction of the first type to execute with one or more added stalls within the given HW resource group, in response to a condition being met, said condition comprising determining the first thread is associated with an instruction of the first type and a second thread of the at least two active threads is not associated with an instruction of the first type; and
        set the thread mode for the first thread to a second mode which causes the issued instruction of the first type to execute without said one or more added stalls within the given HW resource group, in response to said condition not being met.

2. The microprocessor as recited in claim 1, wherein the issued instruction of the first type is at least one of the following instructions: a multi-precision multiplication cryptographic instruction, a Montgomery multiplication cryptographic instruction, and a Montgomery square cryptographic instruction.

3. The microprocessor as recited in claim 2, wherein the given HW resource group comprises at least a cryptographic functional unit and a non-cryptographic functional unit.

4. The microprocessor as recited in claim 1, wherein the instruction of the first type causes a plurality of functional units within the given HW resource group to be unavailable for execution for other instructions for a plurality of clock cycles.

5. The microprocessor as recited in claim 3, wherein determining a given thread is associated with an instruction of the first type comprises: (i) determining the given thread is configured to execute an instruction of the first type, or (ii) determining the given thread has recently committed an instruction of the first type.

6. The microprocessor as recited in claim 5, wherein in response to determining the given thread has recently committed an instruction of the first type, the control circuitry is further configured to determine the given thread is no longer associated with an instruction of the first type by detecting the given thread has committed a number of instructions greater than a predetermined threshold, wherein the committed instructions do not include an instruction of the first type.

7. The microprocessor as recited in claim 1, wherein the issued instruction of the first type is executed for a first number of cycles before being stalled for a second number of cycles, wherein the first number of cycles is based on at least one of the following: completion of a given number of execution cycles, completion of a predetermined operation, and a programmable value.

8. The microprocessor as recited in claim 1, wherein intermediate results of the issued instruction of the first type are temporarily stored prior to the one or more added stalls within the given HW resource group.

9. A method for use in a processor, the method comprising:
    concurrently processing instructions corresponding to a plurality of threads, wherein processing utilizes one or more hardware (HW) resource groups each configured to execute instructions;
    wherein for a given HW resource group of the one or more HW resource groups:
        identifying at least two active threads configured to utilize the given HW resource group and execute an instruction of a first type, the given HW resource group being configured to support only one of the at least two threads at a given time;
        setting a thread mode for a first thread of the at least two active threads to a first mode which causes an issued instruction of the first type to execute with one or more added stalls, in response to determining the first thread is associated with an instruction of the first type and a second thread of the at least two active threads is not associated with an instruction of the first type; and setting the thread mode for the first thread to a second mode which causes the issued instruction of the first type to execute without said one or more added stalls within the given HW resource group, in response to said condition is not met.

10. The method as recited in claim 9, wherein the issued instruction of the first type is at least one of the following instructions: a multi-precision multiplication cryptographic instruction, a Montgomery multiplication cryptographic instruction, and a Montgomery square cryptographic instruction.

11. The method as recited in claim 10, wherein the given HW resource group comprises at least a cryptographic functional unit and a non-cryptographic functional unit.

12. The method as recited in claim 11, further comprising:
identifying a third thread configured to utilize the given HW resource group; and
determining the third thread is not associated with an instruction of the first type, wherein the given HW resource group is configured to support each of the second thread and the third thread at a given time.

13. The method as recited in claim 11, wherein determining a given thread is associated with an instruction of the first type comprises: (i) determining the given thread is configured to execute an instruction of the first type, or (ii) determining the given thread has recently committed an instruction of the first type.

14. The method as recited in claim 13, wherein in response to determining the given thread has recently committed an instruction of the first type, further comprising determining the given thread is no longer associated with an instruction of the first type by detecting the given thread has committed a number of instructions greater than a predetermined threshold, wherein the committed instructions do not include an instruction of the first type.

15. The method as recited in claim 9, wherein to identify a particular thread configured to utilize the given HW resource group, the method further comprises determining an instruction of the particular thread is scheduled for execution by the given HW resource group or an instruction of the particular thread is being executed by the given HW resource group.

16. The method as recited in claim 9, wherein in response to detecting the thread mode for the first thread is set to the first mode, the method further comprises utilizing the given HW resource group by an instruction in the second thread during the one or more added stalls of the issued instruction of the first type in the first thread.

17. A non-transitory computer readable storage medium storing program instructions, wherein the program instructions are executable to:
concurrently process instructions corresponding to a plurality of threads, wherein processing utilizes one or more hardware (HW) resource groups each configured to execute instructions;
wherein for a given HW resource group of the one or more HW resource groups:
identify at least two active threads configured to utilize the given HW resource group and execute an instruction of a first type, the given HW resource group being configured to support only one of the at least two threads at a given time;
set a thread mode for a first thread of the at least two active threads to a first mode which causes an issued instruction of the first type to execute with one or more added stalls, in response to determining the first thread is associated with an instruction of the first type and a second thread of the at least active two threads is not associated with an instruction of the first type; and
set the thread mode for the first thread to a second mode which causes the issued instruction of the first type to execute without said one or more added stalls within the given HW resource group, in response to said condition is not met.

18. The non-transitory computer readable storage medium as recited in claim 17, wherein the issued instruction of the first type is at least one of the following instructions: a multi-precision multiplication cryptographic instruction, a Montgomery multiplication cryptographic instruction, and a Montgomery square cryptographic instruction.

19. The non-transitory computer readable storage medium as recited in claim 18, wherein the given HW resource group comprises at least a cryptographic functional unit and a non-cryptographic functional unit.

20. The non-transitory computer readable storage medium as recited in claim 19, wherein in response to detecting the thread mode for the first thread is set to the first mode, an instruction in the second thread utilizes the given HW resource group during the one or more added stalls of the issued instruction of the first type in the first thread.

* * * * *

UNITED STATES PATENT AND TRADEMARK OFFICE
CERTIFICATE OF CORRECTION

PATENT NO. : 8,560,814 B2
APPLICATION NO. : 12/773278
DATED : October 15, 2013
INVENTOR(S) : Golla et al.

It is certified that error appears in the above-identified patent and that said Letters Patent is hereby corrected as shown below:

In the Specification

Column 4, line 51, after "threaded" delete "5".

In the Claims

Column 18, line 22, in Claim 17, delete "active two" and insert -- two active --, therefor.

Signed and Sealed this
Third Day of June, 2014

Michelle K. Lee
*Deputy Director of the United States Patent and Trademark Office*